J. R. EICHENBERGER & C. G. BINKLY.

Nut-Locks.

No. 137,426. Patented April 1, 1873.

WITNESSES.

INVENTORS.

UNITED STATES PATENT OFFICE.

JOHANN R. EICHENBERGER AND CHRISTIAN G. BINKLY, OF BURTON CITY, OHIO.

IMPROVEMENT IN NUT-LOCKS.

Specification forming part of Letters Patent No. 137,426, dated April 1, 1873; application filed January 25, 1873.

*To all whom it may concern:*

Be it known that we, J. R. EICHENBERGER and C. G. BINKLY, of Burton City, in the county of Wayne and State of Ohio, have invented a new and valuable Improvement in Nut-Locks; and we do hereby declare that the following is a full, clear, and exact description of the construction and operation of the same, reference being had to the annexed drawing making a part of this specification, and to the letters and figures of reference marked thereon.

Figure 1:
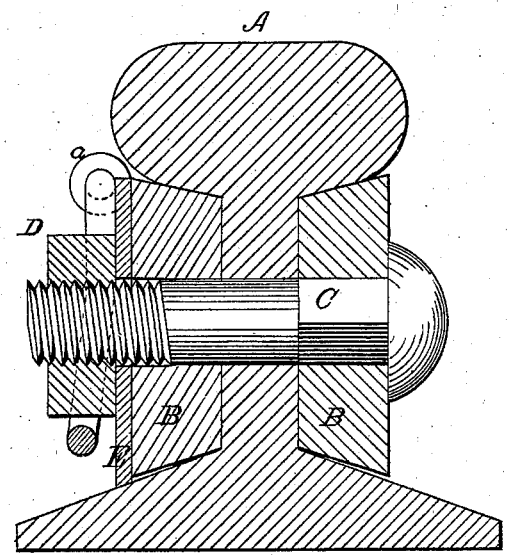
Figure 2:
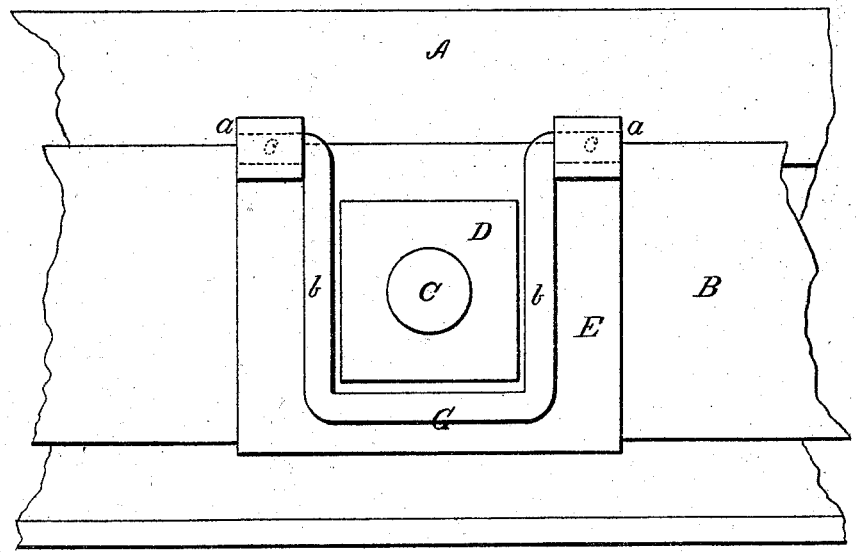

Figure 1 of the drawing is a representation of a sectional view of our nut-lock. Fig. 2 is a side view of the same.

This invention has relation to an improvement in nut-locks; and it consists in the construction and novel arrangement of devices composing a combined nut-lock and washer, as hereinafter more particularly described. The object of the present invention is to provide an economical nut-lock, which, while perfectly secure when in position, may be readily disengaged whenever it may become necessary to turn the nuts on the bolts; and in order to effect this result, the washer-plate in ordinary use has been modified in form somewhat by providing it with ears or extensions, which are curled forward in cylindrical form, to serve as hinge-barrels for the journal ends of a stout wire loop, which forms the nut-lock.

In the accompanying drawing, the letter A designates a railroad rail; B, the fish-plates; C, the bolt; and D, the nut. E indicates the washer placed on the bolt under the nut. This washer is provided at its upper edge with the extensions or ears $a$, one at each side, which are curled forward in cylindrical form to serve as barrels for the journals of the loop. G designates a stout wire, bent downward at its middle portion to form a loop having straight arms $b$. Usually the form of this loop is that of three sides of a rectangle, as it will then fit the nut closely and without play. The ends of the loop are bent outward to form the journals $c$, upon which it turns in the barrels of the washer-plate.

To lock the nut, the loop is pressed down over it, and when in this position it is not liable to be displaced by the jarring of the rails, as its gravitation will keep it pendent in the vertical plane. It can be readily lifted off the nut when it is required to manipulate the latter.

What we claim as our invention, and desire to secure by Letters Patent, is—

The nut-lock consisting of a washer having the hinge-barrels $a\ a$ and a stout rectangular loop arranged to embrace the nut on two sides and the bottom, and turned at its ends to form the hinge-journals $c\ c$, substantially as specified.

In testimony that we claim the above we have hereunto subscribed our names in the presence of two witnesses.

JOHANN R. EICHENBERGER.
  CHRISTIAN G. BINKLY.

Witnesses:
 M. C. ROUCH,
 H. M. WILSON.